United States Patent [19]

Watanabe

[11] Patent Number: 4,734,201

[45] Date of Patent: Mar. 29, 1988

[54] DEIONIZED WATER SUPPLYING SYSTEM

[75] Inventor: Mituru Watanabe, Tokyo, Japan

[73] Assignee: Oki Electric Industry Co., Ltd., Tokyo, Japan

[21] Appl. No.: 891,338

[22] Filed: Jul. 31, 1986

Related U.S. Application Data

[63] Continuation-in-part of Ser. No. 766,293, Aug. 16, 1985, abandoned, and a continuation-in-part of Ser. No. 766,295, Aug. 16, 1985, Pat. No. 4,644,969.

[30] Foreign Application Priority Data

| Aug. 20, 1984 | [JP] | Japan | 59-171595 |
| Aug. 20, 1984 | [JP] | Japan | 59-125348 |
| Sep. 25, 1984 | [JP] | Japan | 59-143511 |

[51] Int. Cl.⁴ .................. C02F 1/42; F16K 11/02; F16K 31/126
[52] U.S. Cl. ............... 210/685; 137/625.27; 210/194; 210/263; 210/900
[58] Field of Search .......... 137/625.26, 625.27, 137/625.49, 625.5; 210/677, 685, 686, 167, 194, 278, 424–426, 900, 263; 251/335.1, 335.2, 335.3

[56] References Cited

U.S. PATENT DOCUMENTS

| 783,312 | 2/1905 | Rife | 137/625.47 |
| 955,770 | 4/1910 | Dehn | 137/625.26 |
| 1,983,106 | 12/1934 | Sundstrom | 251/335.3 |
| 2,035,202 | 3/1936 | Smith | 251/335.2 |
| 2,682,386 | 6/1954 | Lindsay | 251/335.3 |
| 2,691,773 | 10/1954 | Lichtenberger | 74/18.2 |
| 2,693,822 | 11/1954 | Gerow et al. | 137/551 |
| 3,260,504 | 7/1966 | Mojonnier et al. | 251/357 |
| 3,269,411 | 8/1966 | Teston | 137/613 |
| 3,870,033 | 3/1975 | Faylor et al. | 210/900 |
| 4,379,053 | 4/1983 | Brane | 210/424 |

FOREIGN PATENT DOCUMENTS

| 1181053 | 1/1959 | France | 251/335 B |
| 869101 | 5/1961 | United Kingdom | 251/335 B |

Primary Examiner—Ivars Cintins
Attorney, Agent, or Firm—Wenderoth, Lind & Ponack

[57] ABSTRACT

A deionized water supplying system is connected to a deionized water supply tank, a deionized water supply pipe and a deionized water circulating pipe. The system includes a three-ported valve having a first port connected to the deionized water supply pipe via a first branch pipe, a second port connected to the first port when the three-ported valve is in a first state, and a third port connected to the deionized water circulating pipe via a second branch pipe and communicating with the first port when the three-ported valve is in a second state.

14 Claims, 8 Drawing Figures

DEIONIZED WATER SUPPLYING SYSTEM

This application is a continuation-in-part application of U.S. application Ser. No. 766,293 filed Aug. 16, 1985, now abandoned, and U.S. application Ser. No. 766,295 filed Aug. 16, 1985, now U.S. Pat. No. 4,644,969.

BACKGROUND OF THE INVENTION

1. Field of the invention

This invention relates to a deionized water supplying system, and more particularly to a deionized water supplying system suitable for preventing impurities from entering into the deionized water.

2. Description of the related art

In the manufacture of miniaturized LSI devices, a deionized water supplying system plays an important role in the wafer process.

In the deionized water supplying system, unused deionized water having passed through a use point of the water process is refined and supplied to the use point again. This method is called the circulating method.

FIGS. 1(a) and 1(b) show a conventional deionized water supplying mechanism used in the deionized water supplying system, such as that described in Japanese Patent Publication No. 151026/1983.

In these figures, a two-ported valve 3 is connected to a deionized water tank 4 for the wafer cleaning process and two branch pipes 2 and 7 associated with a three-forked pipe 6. A maintenance valve 8 illustrated in FIG. 1(b) is used for replacing the valve 3. Further, the conductance of branch pipe 7 is less than that of branch pipe 2.

When the deionized water tank 4 need not be supplied with deionized water, unused deionized water flows from a deionized water supplying pipe 1 to a deionized water circulating pipe 5 via branch pipes 2 and 7 and three-forked pipe 6.

During the wafer cleaning process, the two-ported valve 3 is opened and according to the difference of the conductance, the greater part of deionized water flows from the deionized water supplying pipe 1 to the deionized water tank 4 via the two-ported valve 3.

However, the conventional mechanism described above has disadvantages that while the two-ported valve 3 is closed, a quantity of deionized water normally remains between the two-ported valve 3 and the three-forked pipe 6.

Although the distance between two-ported valve 3 and three-forked pipe 6 is about 20-90 cm, if the holdup of deionized water lasts a long time, bacteria or microbes will breed and cause the contamination of the deionized water supplying system.

SUMMARY OF THE INVENTION

It is an object of the present invention to provide a deionized water supplying system which reduces the holdup of deionized water therein.

It is another object of the present invention to provide a deionized water supplying system which doesn't need two branch pipes having a difference in conductance.

According to the invention, there is provided a deionized water supply system comprising a deionized water supply tank, a deionized water supply pipe for supplying deionized water, a deionized water circulating pipe, a three-ported valve having a first port connected to said deionized water tank, a second port and a third port, said valve having only two states of communication among said first, second and third ports, said two states being alternative and including a first state defined by said first port communicating with said second port and communication between said first and third ports being blocked, and a second state defined by said first port communicating with said third port and communication between said first and second ports being blocked, a first branch pipe connected between said first port and said deionized water circulating pipe, a second branch pipe connected between said third port and said deionized water circulating pipe, whereby deionized water flows from said deionized water supply pipe to said deionized water tank via said first branch pipe when said valve is in said first state and the deionized water flows from said deionized water supply pipe to said deionized water circulating pipe via said first branch pipe and said second branch pipe when said valve is in said second state, and a polishing unit connected to said deionized water supply pipe for purifying the deionized water flowing in said deionized water supply pipe.

DETAILED DESCRIPTION OF THE PREFERRED EMBODIMENT

Figure 1A:
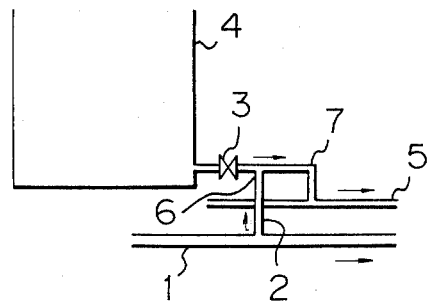
FIG. 1(a) is a schematic representation of a prior deionized water supplying mechanism.
Figure 1B:
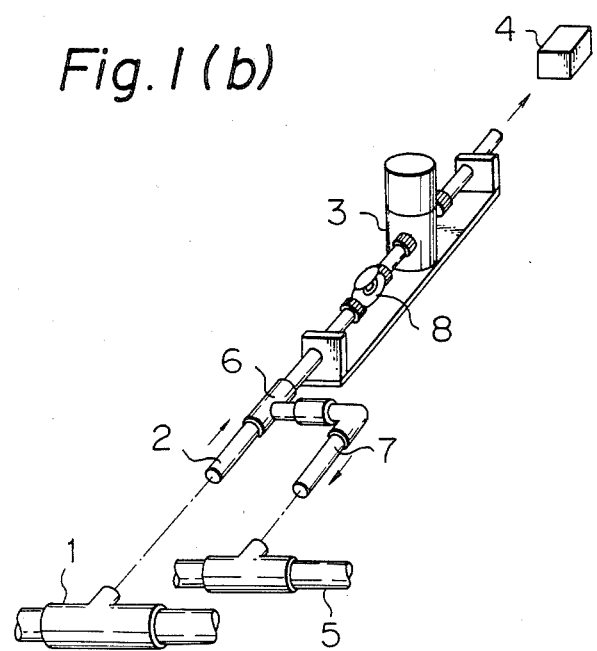
FIG. 1(b) is a schematic perspective illustration of the prior deionized water supplying mechanism.
Figure 2:
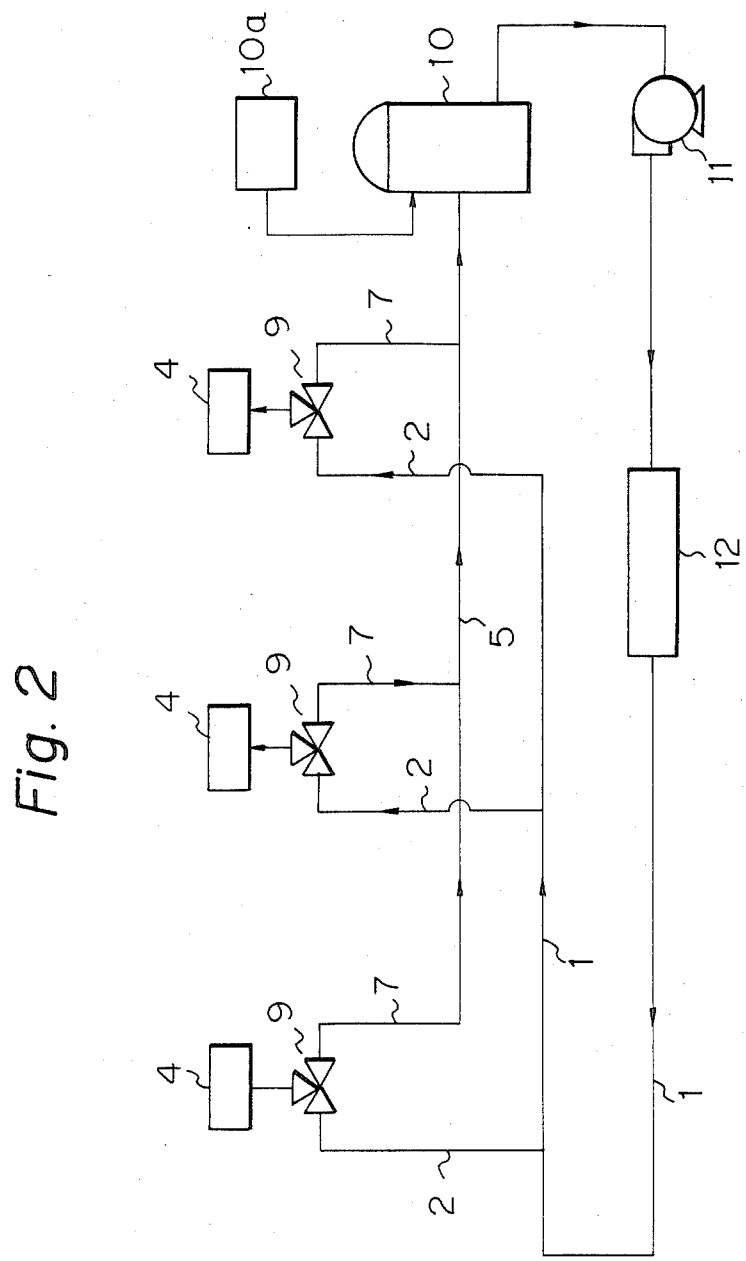
FIG. 2 is a somewhat diagrammatic plumbing diagram illustrating the paths of fluid flow of a deionized water supplying system according to this invention.

A flow of deionized water in the deionized water supplying system according to this invention will be described with reference to FIG. 2.

Deionized water produced in a deionized water production means 10a flows from the production means to a deionized water supplying source or tank 10. Deionized water flows from the deionized water supplying tank 10 which is filled with deionized water to a polishing unit 12 through a pump 11. The polishing unit 12 purifies deionized water being supplied. Then, the high purity deionized water flows from the polishing unit 12 to a three-ported valve 9 through a deionized water supplying pipe 1 and a branch pipe 2. The three-ported valve 9 selects a flow of deionized water from two flows. In one flow, deionized water flows from the three-ported valve 9 to a deionized water treatment tank 4. In the deionized water treatment tank 4, deionized water is used in a deionized water treatment process such as a semiconductor wafer cleaning process. In another flow, deionized water flows from the three-ported valve 9 to the deionized water supplying tank 10 through a branch pipe 7 and a deionized water circulating pipe 5. That is, deionized water circulates through a deionized water supplying system.

A deionized water supplying system according to this invention will be described with reference to FIGS. 3(a) and 3(b).

Figure 3:
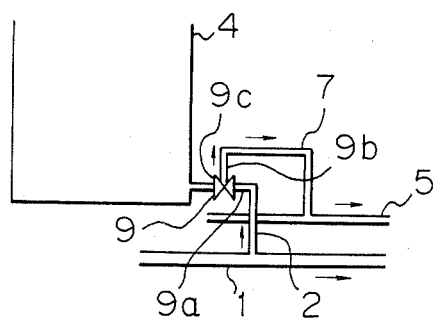
FIG. 3(a) is a schematic representation of a preferred embodiment of the invention.
FIG. 3(b) is a schematic perspective illustration of the preferred embodiment of the invention.
Figure 3:
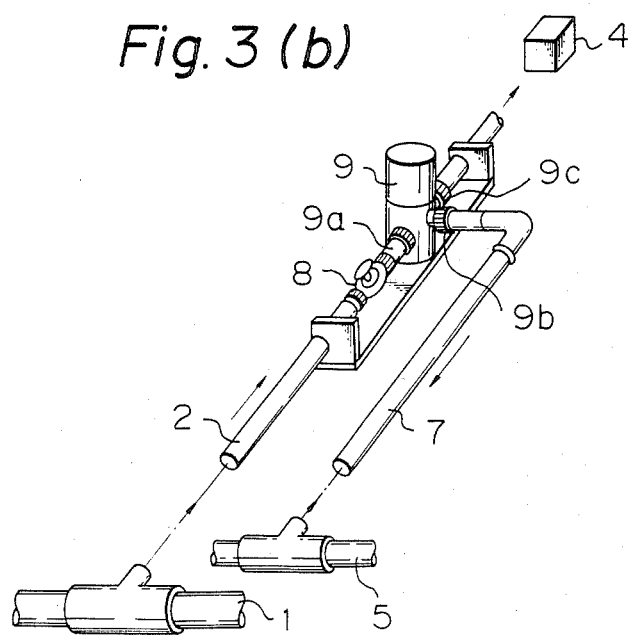

In FIGS. 3(a) and 3(b), the three-ported valve 9 has a common port 9a connected to the deionized water supplying pipe 1 via branch pipe 2, a normally closed port 9c connected to the deionized water treatment tank 4, and a normally open port 9b connected to the deionized water circulating pipe 5 via branch pipe 7. According to the illustrated embodiment, if the tank 4 is not in the wafer cleaning process, the common port 9a communicates with the normally open port 9b and deionized water flows from the deionized water supplying pipe 1 to the deionized water circulating pipe 5 via branch pipe 2, common port 9a, normally open port 9b and branch pipe 7. On the other hand, during the semiconductor wafer cleaning process, the common port 9a communicates with the normally closed port 9c and deionized water flows from the deionized water supplying pipe 1 to the deionized water tank 4 via common port 9a and normally closed port 9c.

Figure 4:
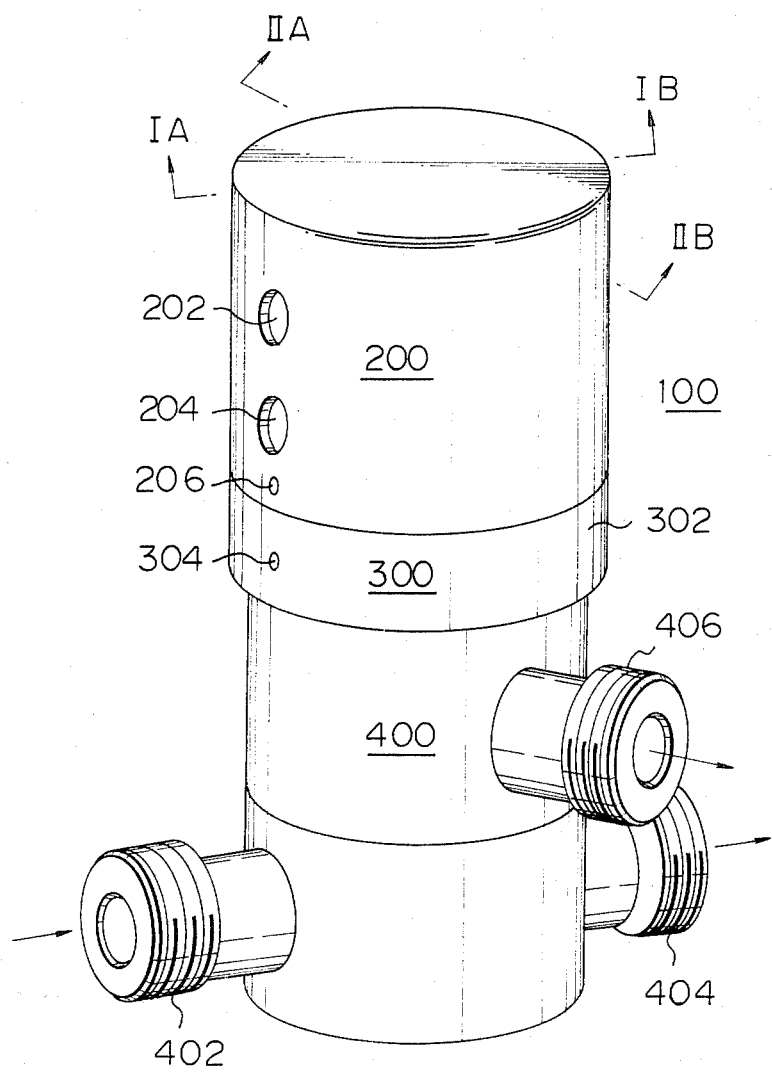
FIG. 4 is a perspective whole view showing an air-operated three-way water control valve according to the preferred embodiment of this invention.
Figure 5:
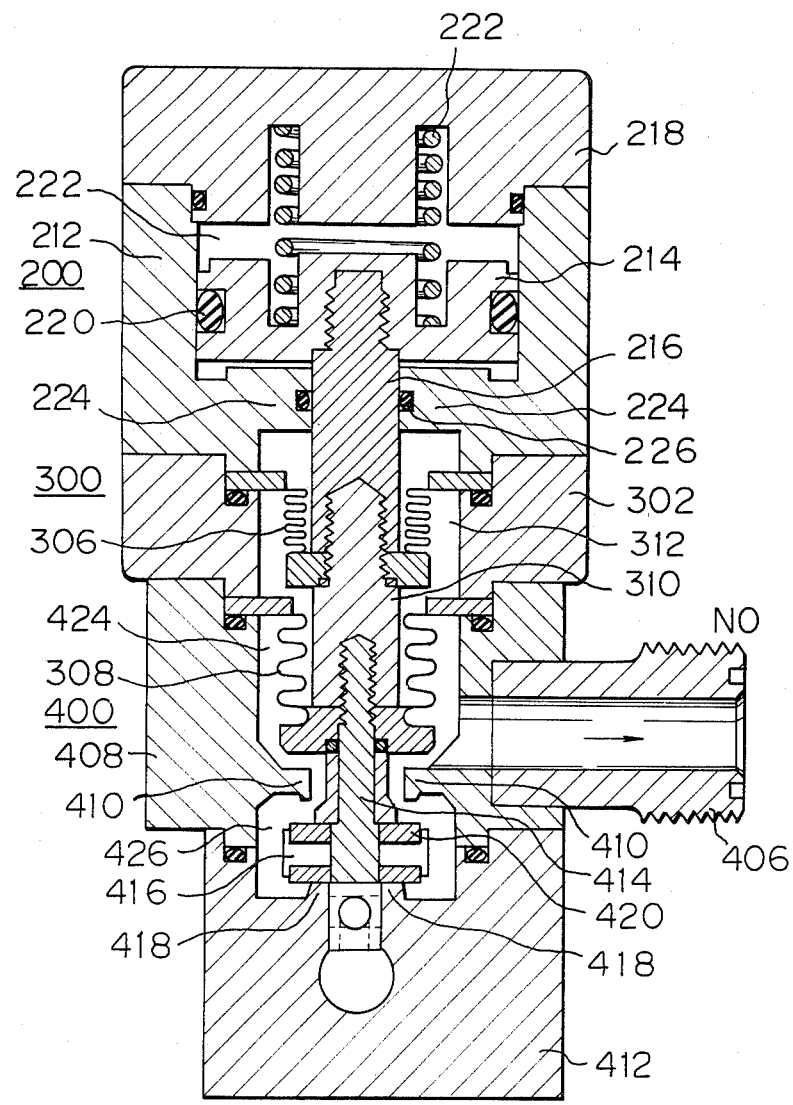
FIG. 5 is a cross-sectional view taken along line IIA-IIB of FIG. 4.
Figure 6:
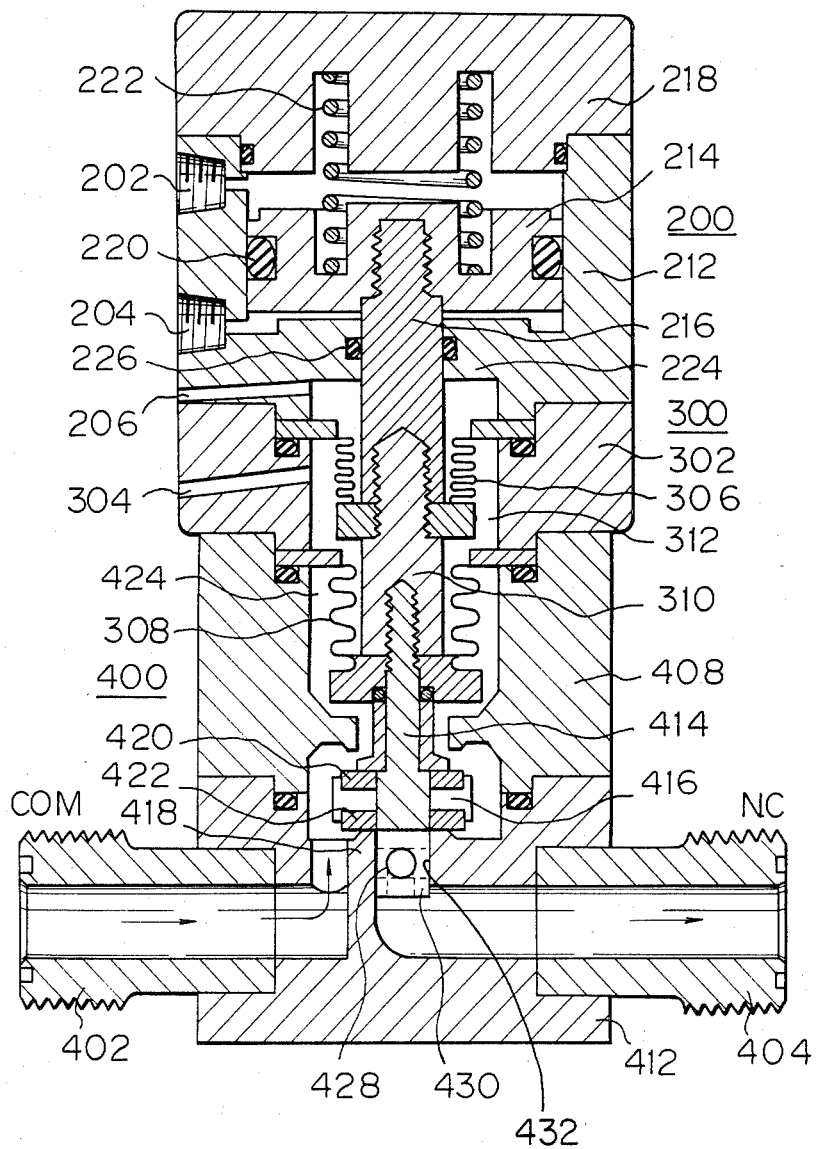
FIG. 6 is a cross-sectional view taken along IA-IB of FIG. 4.

In this embodiment, the three-ported value 9 is an air-operated three way-water control valve. FIGS. 4–6 show a water control valve 100 used in this embodiment.

In FIG. 4, a water control valve 100 comprises an air actuating portion 200 driven by compressed air, an intermediate cylinder 300, and a valve portion 400 for controlling the flow of pure water. The actuating portion 200 has two air inlets 202 and 204 which introduce highly compressed air. The intermediate cylinder 300 includes a block 302 having therein an air releasing opening 304. Also, the valve portion 400 is mounted with a main connector 402 for intaking pure water (corresponding to port 92 in FIGS. 3(a) and 3(b), and connectors 404, 406 for supplying pure water (corresponding to ports 9c and 9b, respectively, in FIGS. 3(a) and 3(b)). The connector 402 will be coupled to a main supply line of the pure water piping system. On the other hand, the connector 406 will be coupled to a main return line of the piping system through a branch pipe line, and the connector 404 will be coupled to bibcocks in the IC plant through another branch pipe line.

As shown in FIGS. 5 and 6, the actuating portion 200 comprises an air cylinder 212, a piston 214 placed inside the cylinder 212, a piston shaft 216 fixedly connected to the piston 214 and a cylinder cap 218 closing the cylinder block 212. A polyvinyl chloride material, for example, is suitable for the cylinder block 212, the piston 214, and the cylinder cap 218. A polyvinylidene flouride resin material may be preferrably used for the piston shaft 216. An O-ring 220 is placed in a gasket groove of the piston 214 which is loaded downward by return springs 222. The piston shaft 216 is supported by a piston guide portion 224 of the cylinder block 212 and is packed with an O-ring 226 of fluororubber material. Also, the cylinder block 212 has an air releasing opening 206 for providing communication between an inner space of the cylinder block 212 and the atmosphere.

The intermediate cylinder block 302 is serially mounted to the air cylinder block 212 and has opening 304 allowing the air therein to release to the atmosphere. The intermediate cylinder block 302 is preferrably made of a polyvinyl chloride material. A first bellows 306 is placed in the intermediate cylinder block 302 so as to isolate the inner space thereof from the piston shaft 216. One end of the bellows 306 is fixedly hermetically mounted to a lower end portion of the piston shaft 216, and the other end is mounted to an inner upper portion of the intermediate cylinder block 302. The bellows 306 is formed of Teflon (Trademark of Du Pont for polytetrafluoroethylene) which is chemically stable and two thick end portions thereof may be formed integrally therewith. An intermediate shaft 310 is serially connected to the piston shaft 216. For example, a vinylidene fluoride resin material is suitable for the intermediate shaft 310.

A second bellows 308 is provided in such a way that one end is fixedly mounted to a lower portion of the intermediate cylinder 302 and the other end is fixedly connected to a lower portion of the intermediate shaft 310. A closed space 312 is formed by both the bellows 306 and 308. The second bellows 308 is preferrably also of Teflon material and may be formed integrally so as to have two thick end portions.

The valve portion 400 comprises a valve cylinder 408 having a first stationary valve seat 410, a valve base portion 412 having a second stationary valve seat 418, a valve shaft 414, and an obturator or valve member 416. The valve shaft 414 is serially connected to the lower end of the intermediate shaft 310. The obturator 416 is mounted to a lower portion of the valve shaft 414. The second bellows 308 is contained in the valve cylinder 408. The obturator 416 is placed between the stationary valve seats 410 and 418, and has seat packings 420 and 422 of fluororubber material placed on opposite sides thereof.

The valve cylinder 408 is provided with the connector 406 and has a first space 424 communicating with the passage thereof. A second space 426 containing the obturator 416 communicates with the first space 424 through the middle opening of the first stationary valve seat 410. Also, the second space 426 communicates with the passage of the connector 402. The passage of the connector 404 communicates with the space 426 through an opening in the second stationary valve seat 418.

For example, the valve cylinder 408 and the valve base portion 412 are made of polyethylene material. The valve shaft 414 is made of a polytrifluoride ethylene chloride resin material. The obturator 416 is made of a polyethylene material.

In operation, when pure water is not used at use points of an IC plant, the obturator 416 is pressed against the second stationary valve seat 418 by supplying compressed air of 3 to 5 Kg/cm$^2$ to the upper side of the piston 214 through the air inlet 202.

Then, pure water flows from the connector 402 to the connector 406 through the first and second spaces 424 and 426.

When pure water is used at the use points of the IC plant, the obturator 416 is pressed against the first stationary valve seat 410 by supplying compressed air to the lower side of the piston 214 through the air inlet 204. In this case, pure water flows from the connector 402 to the connector 404 through the second space 426 and holes 428 in a guiding portion 430 of the obturator 416 below the valve shaft 414 slidably mounted in a through hole 432 of the second stationary valve seat 418.

According to this embodiment, since two bellows are provided so as to separate the piston shaft from one bellows contacting pure water, pure water pollution due to bellows failure can be prevented. In this embodiment, lubricating oil applied on the piston shaft is collected in the bellows 306. In case the bellows 308 fails(cracks) the leaked pure water which leaks is collected in the intermediate space 312 and then released therefrom through the opening 304. Therefore, an operator can easily find the crack failure of the bellows before the pure water piping system is completely polluted.

During the wafer cleaning process, some deionized water remains in the branch pipe 7. But, only about 40 seconds of time is needed to supply a sufficient quantity of deionized water to the deionized water tank 4, so that the deionized water remaining or standing in the branch pipe 7 provides little opportunity for contamination with bacteria or microbes to occur. Further, the standing water remaining in the branch pipe 7 is transferred via pipe 5 downstream of valve 9 to conventional equipment(the polishing unit 12) which refines unused(purifies) deionized water. Thus the purity of water standing in the branch pipe 7 has no influence on the purity of the deionized water transferred to the deionized water tank 4.

Therefore, whether or not the system is in a wafer cleaning stage, little standing deionized water remains in the three-ported valve 9.

What is claimed is:

1. A deionized water supply system, comprising:
    a deionized water supply tank;
    a deionized water supply pipe connected to said supply tank for supplying deionized water;
    a deionized water circulating pipe connected to said supply tank;
    a three-ported pneumatically-operated water control valve including:
        air actuating means having an air cylinder, an air piston within said air cylinder, and a piston shaft connected to said piston;
        a valve portion for controlling the flow of water and operated by said air actuating means, said valve portion comprising a valve cylinder, a pair of stationary valve seats within said valve cylinder so as to face each other in a parallel manner, an obturator positioned between said stationary valve seats, a valve shaft connecting to said obturator, a first port, a second port and a third port;
        an intermediate cylinder mounted between said air cylinder and said valve cylinder;
        an intermediate valve shaft serially connected between said piston shaft and said valve shaft;
        a first bellows having one end hermetically mounted to an upper portion of said intermediate valve shaft and another end hermetically mounted to the inner wall of said intermediate cylinder; and
        a second bellows having one end hermetically mounted to a lower portion of said intermediate valve shaft and another end hermetically mounted to the inner wall of said intermediate cylinder, whereby said first and second bellows form a space isolating said piston shaft from said valve shaft, said three-ported valve having only two states of communication among said first, second and third ports, said two states being alternative and including a first state defined by said first port communicating with said second port and communication between said first and third ports being blocked, and a second state defined by said first port communicating with said third port and communication between said first and second ports being blocked;
    a first branch pipe connected between said first port and said deionized water supply pipe;
    a second branch pipe connected between said third port and said deionized water circulating pipe;
    whereby deionized water flows from said deionized water supply pipe to said second port via said first branch pipe when said valve is in said first state and the deionized water flows from said deionized water supply pipe to said deionized water circulating pipe via said first branch pipe and said second branch pipe when said valve is in said second state; and
    a polishing unit connected to said deionized water supply pipe for purifying downstream water flowing in said deionized water supply pipe.

2. A deionized water supply system as claimed in claim 1, wherein said intermediate cylinder has a small opening communicating to the atmosphere said space isolating said piston shaft from said valve shaft.

3. A deionized water supply system as claimed in claim 1, wherein said system further comprises a deionized water production means for supplying deionized water to said water supply tank.

4. A deionized water supply system as claimed in claim 1, wherein said second port is connected to a deionized water treatment tank.

5. A deionized water supply system as claimed in claim 1, wherein said system comprises a plurality of branch units each having a respective said first branch pipe, a respective said second branch pipe and a respective said three-ported valve.

6. A deionized water supply system as claimed in claim 5, wherein said units are connected in parallel to said supply pipe and said circulating pipe.

7. A method of supplying deionized water comprising the steps of:
    producing a deionized water in a deionized water production means;
    supplying deionized water from a deionized water supply tank;
    purifying the water supplied from said supply tank in a polishing unit;
    feeding the purified water supplied from said polishing unit into a three-ported pneumatically-operated water control valve including:
        air actuating means having an air cylinder, an air piston within said air cylinder, and a piston shaft connected to said piston;
        a valve portion for controlling the flow of water and operated by said air actuating means, said valve portion comprising a valve cylinder, a pair of stationary valve seats within said valve cylinder so as to face each other in a parallel manner, an obturator positioned between said stationary valve seats, a valve shaft connecting to said obturator, a first port, a second port and a third port;
        an intermediate cylinder mounted between said air cylinder and said valve cylinder;
        an intermediate valve shaft serially connected between said piston shaft and said valve shaft;
        a first bellows having one end hermetically mounted to an upper portion of said intermediate valve shaft and another end hermetically mounted to the inner wall of said intermediate cylinder; and
        a second bellows having one end hermetically mounted to a lower portion of said intermediate valve shaft and another end hermetically mounted to the inner wall of said intermediate cylinder, whereby said first and second bellows form a space isolating said piston shaft from said valve shaft, said three-ported control valve having only two states of communication among said first, second and third ports, said two states being alternative and including a first state defined by said first port communicated with said second port and communication between said first and third ports being blocked, and a second state defined by said first port communicating with said third port and communication between said first and second ports being blocked; and choosing between supplying fed water to a deionized water treatment tank by operating said control valve in said first state thereof and returning the fed water to said deionized water supplying tank by operating said control valve in said second state thereof.

8. A method of supplying deionized water as claimed in claim 7, further comprising communicating to the atmosphere said space isolating said piston shaft from said valve shaft by means of a small opening in said intermediate cylinder.

9. A deionized water supply system comprising:
a source of deionized water;
a deionized water supply pipe connected to said source for supplying deionized water therefrom;
a deionized water circulating pipe for returning deionized water to said source;
valve means for alternatively passing purified deionized water from said supply pipe to a position of utilization or to said circulating pipe, said valve means including a first port connected to said supply pipe, a second port for connection to the position of utilization and a third port connected to said circulating pipe, and said valve means comprising a pneumatically operated control valve including a valve portion for controlling the flow of water from said first port to said second port or said third port, an air actuating portion for controlling the operation of said valve portion, and an intermediate portion connecting said air actuating portion to said valve portion and preventing contamination of water in said valve portion;

said valve portion comprising a valve cylinder into which open said first, second and third ports, first and second spaced stationary valve seats, and a valve member connected to a valve shaft and movable thereby between a first state seated on said first valve seat and spaced from said second valve seat, whereat said first port communicates with said second port and purified deionized water is passed therethrough to the position of utilization and communication between said first and third ports is blocked to prevent purified deionized water from passing therethrough to said circulating pipe, and a second state seated on said second valve seat and spaced from said first valve seat, whereat said first port communicates with said third port and purified deionized water is passed therethrough to said circulating pipe and communication between said first and second ports is blocked to prevent purified deionized water from passing therethrough to the position of utilization;

said air actuating portion comprising an air cylinder, an air piston movable within said cylinder and a piston shaft connected to said piston, whereby the supply of compressed air into said cylinder moves said piston in opposite directions therein; and said intermediate portion comprising an intermediate cylinder mounted between said air cylinder and said valve cylinder, an intermediate shaft connected between said piston shaft and said valve shaft, whereby movement of said piston within said air cylinder is transmitted by said piston shaft to said intermediate shaft and said valve shaft, thereby moving said valve member between said first and second states thereof, a first bellows having one end hermetically connected to an upper portion of said intermediate shaft and another end hermetically connected to an inner wall of said intermediate cylinder, and a second bellows having one end hermetically connected to a lower portion of said intermediate shaft and another end hermetically connected to said inner wall of said intermediate cylinder, said first and second bellows defining therebetween a space isolating said piston shaft from said valve shaft.

10. A deionized water supply system as claimed in claim 9, further comprising a polishing unit connected to said supply pipe for purifying deionized water supplied from said source by said supply pipe.

11. A deionized water supply system as claimed in claim 9, wherein said intermediate cylinder has a small opening communicating to the atmosphere said space isolating said piston shaft from said valve shaft.

12. A deionized water supply system as claimed in claim 9, further comprising a first branch pipe connecting said supply pipe to said first port, and a second branch pipe connecting said third port to said circulating pipe.

13. A deionized water supply system as claimed in claim 12, wherein said system comprises a plurality of branch units each having a respective said first branch pipe, a respective said second branch pipe and a respective said three-ported valve.

14. A deionized water supply system as claimed in claim 13, wherein said units are connected in parallel to said supply pipe and said circulating pipe.

* * * * *